United States Patent [19]
Serovy, deceased et al.

[11] 3,955,320
[45] May 11, 1976

[54] PLANTER BOX

[76] Inventors: Walter Serovy, deceased, late of Bel Air, Md., by Herbert J. Arnold, administrator, W. R. Grace Bldg., Baltimore, Md. 21203

[22] Filed: Apr. 8, 1974

[21] Appl. No.: 458,761

[52] U.S. Cl. .................................. 47/34 R; 217/5; 217/12 R; 217/13; 217/65; 220/4 F
[51] Int. Cl.² ..................... A01G 9/02; B65D 9/06; B65D 9/12; B65D 9/34
[58] Field of Search............. 47/34, 37, 34 R, 34.11; 220/4 F; 217/12 R, 13, 43, 65, 5

[56] References Cited
UNITED STATES PATENTS

| | | | |
|---|---|---|---|
| 486,819 | 11/1892 | Carter | 217/12 R |
| 647,361 | 4/1900 | Barnes | 217/12 R |
| 653,514 | 7/1900 | Kasschau | 217/65 UX |
| 991,037 | 5/1911 | Spies | 217/5 |
| 1,511,613 | 10/1924 | Joern | 220/4 F X |
| 1,631,409 | 6/1927 | Finn | 47/38.1 |
| 2,615,589 | 10/1952 | Perdue | 217/12 R |
| 2,648,164 | 8/1953 | Bruch | 47/38.1 |
| 3,370,736 | 2/1968 | Voilentchik | 220/4 F |
| 3,374,915 | 3/1968 | Verhein et al | 220/4 F |
| 3,598,273 | 8/1971 | Rau et al | 220/4 F X |

FOREIGN PATENTS OR APPLICATIONS

| | | | |
|---|---|---|---|
| 729,062 | 5/1955 | United Kingdom | 217/12 R |
| 1,018,243 | 1/1966 | United Kingdom | 220/4 F |
| 810,907 | 3/1959 | United Kingdom | 220/4 F |
| 82,978 | 1/1954 | Norway | 217/65 |
| 6,512,068 | 11/1966 | Netherlands | 217/65 |

*Primary Examiner*—Edgar S. Burr
*Assistant Examiner*—Steven A. Bratlie
*Attorney, Agent, or Firm*—J. Wesley Everett

[57] ABSTRACT

The planter box is constructed preferably of wooden planks having two opposite side members, two opposite end members and a bottom member, each of the side members having a mortise extending parallel and inwardly from the opposite end of the planks to receive the edges of the end members; the bottom plank is provided with a mortise extending about its upper surface and adjacent the peripheral edges of the bottom to receive the adjacent edges of the side and end members to form a water-tight joint between the side, end and bottom members throughout the box.

3 Claims, 4 Drawing Figures

PLANTER BOX

The present invention relates to a planter box that is rigidly constructed from wooden planks, or other suitable material, having improved water-tight seams.

One object of the invention is to provide a planter box adapted to be filled with earthen materials such as sand, rocks, liquids, etc. The box is constructed in such a manner that it may be shipped, or may be stored in knockdown state and assembled at a subsequent date and/or place, or the box may be assembled at the place of manufacture or distribution point.

Another object of the invention is to provide a planter box that is made from five specific members, a bottom, two side members and two end members; the side and bottom members are mortised to provide a maximum sealing joint between the bottom, side and end members.

While several objects of the invention have been specifically pointed out, other objects, uses and advantages will become apparent as the nature of the invention is more fully described in the following specifications, with reference to the accompanying drawing in which.

The same and similar reference characters are used to designate the same and similar parts throughout the several views.

Figure 1:
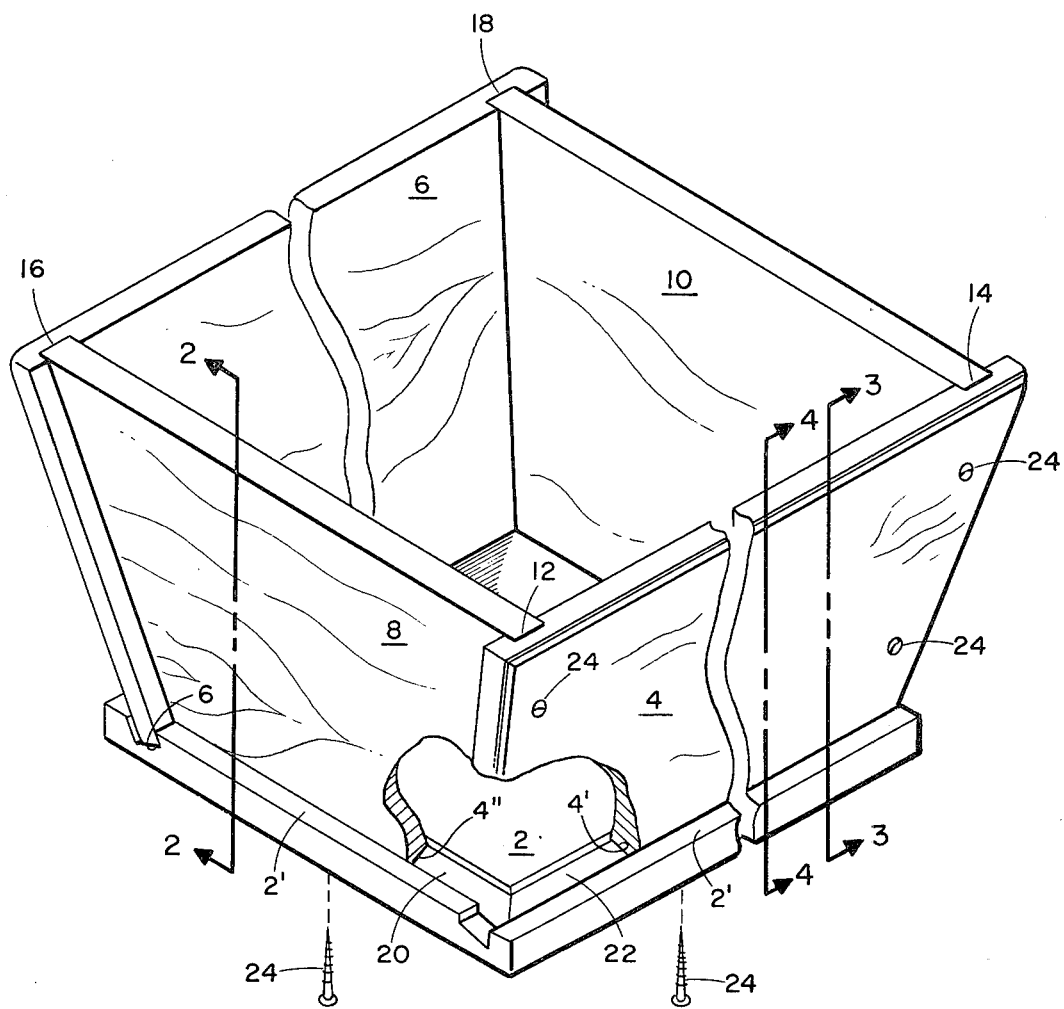
FIG. 1 is a fragmentary perspective view of the box having a section broken away to show the manner in which the bottom, side and end members are joined.
Figure 2:
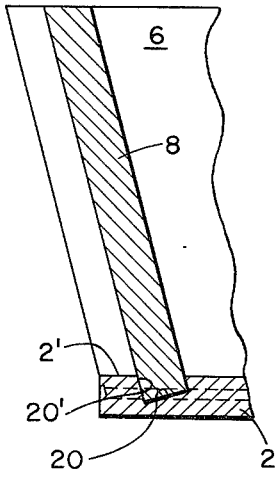
FIG. 2 is a fragmentary sectional view taken along line 2—2 of FIG. 1.
Figure 4:
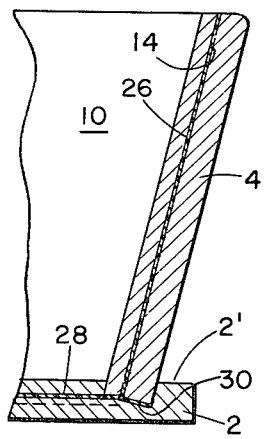
FIG. 4 is a fragmentary sectional view taken along line 4—4 of FIG. 1.
Figure 3:
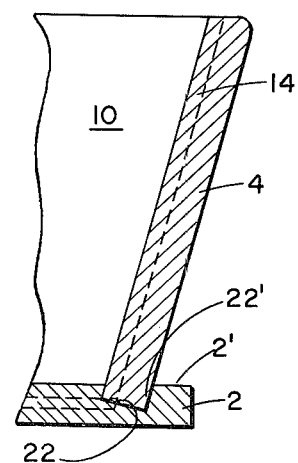
FIG. 3 is a fragmentary sectional view taken along the line 3—3 of FIG. 1.

The box is constructed with a bottom 2, two sidewall members 4 and 6 and two end members 8 and 10. The bottom, side and end members are all formed with parallel side surfaces. The edges of the side wall members engaging the bottom are formed at right angles to the plane of the side surfaces of the side wall members, and the edges of the ends members are formed at right angles to the side surfaces of the end members.

The end members are tapered outwardly from the bottom causing the side members to be flared outwardly along with end members to make the top of the box wider than its bottom.

The sidewalls are mortised, as shown at 12 and 14 and at 16 and 18, into which the lateral edges of the end members are receivable.

The bottom is also mortised on one surface and adjacent its peripheral edge, as shown at 20, to receive the end members; and at 22 to receive the side members.

The bottom of the mortised grooves are angled to receive the right angled edges of the slanting side and end members.

In order for the mortises to receive the slanting right angled edges of the side and end wall members, the mortises must be formed at an angle to the plane of the top surfaces of the bottom.

The mortises are formed inwardly from the peripheral edge of the bottom members to form a substantially solid stop portion 2' for the side and end wall members as they are pressed outwardly by the materials within the box. This angled groove in the bottom member makes the groove deeper along its outer side and not as deep along its inner side and provides a greater surface against which the side and end members will be pressing, as shown at 20 and 22 respectively.

When the sides and ends are set in place in the mortised groove 20 and 22 in the bottom, the box is held tightly together by the screws 24. If it is desired to disassemble the box, the screws may be removed and the box separated so that it may be stacked flat.

If the box is to be assembled permanently at the point of manufacture, the joints of the members may be coated with a waterproof adhesive. The box may also be provided with gaskets 26, 28 and 30 positioned within the mortises to protect the end grain of the side and end members against moisture and rotting. The gaskets do not interfere with the assembling and disassembling of the box.

Most of the liquid in the window box collects at the bottom of the box. The mortised joints are cut and fitted in such a manner that they are substantially leak proof if properly assembled.

While the invention has been illustrated and described in a specific form, it is not intended as a limitation. and the scope of the invention is best defined in the appended claims.

I claim:

1. An open top planter box comprising:

a. a rectangular wooden bottom base member having upper and bottom surfaces, four open grooves extending along its upper surface, two of said grooves extending adjacent two opposite side edges and two of the said grooves extending adjacent two opposite end edges, the side wall grooves adjacent the two side edges extending the full length of the bottom base member between opposite end edges and the end wall grooves extending along the end edges of the bottom base member having their respective ends terminating into each of said side wall grooves, each groove in the bottom base member formed with a flat bottom surface and two lateral side surfaces each of which is perpendicular to the flat bottom surface of each respective groove, the flat bottom surface of each groove being angled downwardly toward the bottom surface with respect to the edges of the bottom base member;

b. A pair of wooden side wall members and a pair of trapezoidal wooden end wall members, each of the side wall members and each of the end wall members having parallel side surfaces, top and bottom edges, and lateral side edges, all of the said side and said end wall members being of substantially the same height and thickness, at least the bottom edges of the side wall and end wall members being perpendicular to the parallel side surfaces of the respective side wall and end wall members;

c. At each lateral side of each of the side wall members an open groove extending inwardly from the edge thereof is provided having a flat bottom surface and two lateral parallel side surfaces the bottom surface of each wall groove being parallel and registering with the respective lateral side edge of each end wall member, the lower ends of the grooves in the side wall members registering with respective end wall grooves in the base member;

d. The two lateral side surfaces of the grooves in the bottom base member being spaced apart to slidably receive the bottom edges of the said side wall and said end wall members;

e. The two lateral parallel side surfaces of each of the grooves in the side wall members receiving a respective end wall lateral side edge therein; and f. The planter box being held together by means for retaining the side wall and end wall members within the grooves in the bottom base member and means for retaining the lateral side edges of the end wall members within the grooves of the side wall members.

2. In a planter box as claimed in claim 1 wherein the grooves are lined with a moisture proof adhesive.

3. In a planter box as claimed in claim 1 wherein at least the grooves in the bottom plank are lined with a removable moisture tight packing.

* * * * *